United States Patent

[11] 3,609,549

[72] Inventors Rudolf H. Hausler
Rolling Meadows;
Robert W. Sampson, Arlington Heights, both of Ill.
[21] Appl. No. 46,346
[22] Filed June 15, 1970
[45] Patented Sept. 28, 1971
[73] Assignee Universal Oil Products Company
Des Plaines, Ill.

[54] CORROSION-MEASURING DEVICE
4 Claims, 2 Drawing Figs.
[52] U.S. Cl..................................................... 324/65 C,
324/65 CR, 324/71 C
[51] Int. Cl......................................................G01n 27/04,
G01n 27/30
[50] Field of Search........................................... 324/65 C,
65 CR, 65 TC, 105, 71 C, 65, 71; 204/1 T, 195, 195 C, 196; 73/86; 338/13

[56] References Cited
UNITED STATES PATENTS
3,067,386  12/1962  Freedman ................... 324/71
3,102,979  9/1963   Schaschl....................... 324/71

Primary Examiner—Herman Karl Saalbach
Assistant Examiner—Marvin Nussbaum
Attorneys—James R. Hoatson, Jr. and Philip T. Liggett ABSTRACT: This invention relates to an improved corrosion-measuring device in which at least a portion of a temperature sensitive voltage output means is located proximate to a corrosion test specimen. The corrosion test specimen is located in a circuit having a stable and normally constant input voltage. The extent of corrosion is determined by the decrease in current resulting from the increase in resistance of the test specimen as it corrodes over a period of time. The temperature sensitive voltage output means is at the same temperature as the test specimen and adjusts the input voltage to negate the effects of varying temperature on the current flowing through the test specimen.

INVENTORS:
Rudolf H. Hausler
Robert W. Sampson
BY:
James R. Hoatson, Jr.
Philip J. Liggett
ATTORNEYS

CORROSION-MEASURING DEVICE

This invention relates to an improved corrosion-measuring device in which at least a portion of a temperature sensitive voltage output means is located proximate to a corrosion test specimen. The corrosion test specimen is located in a circuit having a stable and normally constant input voltage. The extent of corrosion is determined by the decrease in current resulting from the increase in resistance of the test specimen as it corrodes over a period of time. The temperature sensitive voltage output means is at the same temperature as the test specimen and adjusts the input voltage to negate the effects of varying temperature on the current flowing through the test specimen.

BACKGROUND OF THE INVENTION

It is frequently desirable to determine the corrosion resistance of various materials through laboratory or field testing. Such testing is useful to indicate the environments in which a particular metal or alloy may be used satisfactorily and to determine whether a metal, an alloy, or a protective coating conforms to a specification requiring a certain performance in a specified corrosion test.

Corrosion rates may be determined in different ways. Continuous electrical and electrochemical measurements are among the most informative measurements. The most frequently used methods are resistance probe measurements and linear polarization measurements. In resistance probe measurements the cross section of a metal resistance probe or test specimen in a corrosive environment gradually decreases with the result that the resistance of the metal probe increases. The change of resistance is therefore a measure of the progress of corrosion. The actual measurements may be made by including the test specimen as a leg in a Wheatstone Bridge. The resistance of the test specimen is determined by continuously rebalancing the bridge. Alternatively, the resistance can be determined by measuring the current which flows through a test specimen connected in series to a constant potential power source. Both forms of the resistance measurements are temperature sensitive, however. In resistance measurements using a Wheatstone Bridge, one arm of the bridge is usually made of the same material as the test specimen and is kept at the same temperature but isolated from the corrosive medium. This arrangement, although effective in temperature compensation, may have a slow response to temperature fluctuation.

Furthermore, continuous recording of resistance measurements by means of a Wheatstone Bridge is complex and instrumentation usually expensive. On the other hand, continuous recording of the resistance of resistance probes is often desired and practical. It can easily be done if the resistance is measured in terms of current passing at a constant potential, provided practical means for temperature compensation are available. Heretofore, no practical device has yet been implemented for compensating for temperature fluctuations of a test specimen when corrosion is determined by the measurement of current through a series connected test specimen. Resistivity of a test specimen normally increases when temperature increases and decreases when temperature decreases because the resistance changes due to temperature fluctuation are usually greater than resistance changes due to corrosion. For this reason, operation at a constant temperature has been essential.

SUMMARY OF THE INVENTION

Accordingly, it is an object of this invention to provide a resistance-probe-measuring device which automatically compensates for temperature fluctuations in the test specimen so that no calculations are necessary to obtain the correct measurement of current passing through the test specimen as influenced by corrosion.

A related object of this invention is to eliminate the need for rigid temperature control of the test specimen during the corrosion test period.

Another object is to provide a corrosion-testing instrument which will perform alternative modes of corrosion testing. These modes of corrosion testing include a linear polarization measuring system and a temperature-compensated resistance probe. Alternative operation is effected through manual or programmed automatic switches connected to appropriate electrical leads as will be hereinafter described.

Still a further object is to provide a corrosion-testing instrument with simple means of continuous recording of the corrosion related electrical signal.

The objects and advantages of this invention may be more fully understood by reference to the accompanying drawings.

DETAILED DESCRIPTION OF THE DRAWINGS

Figure 1:
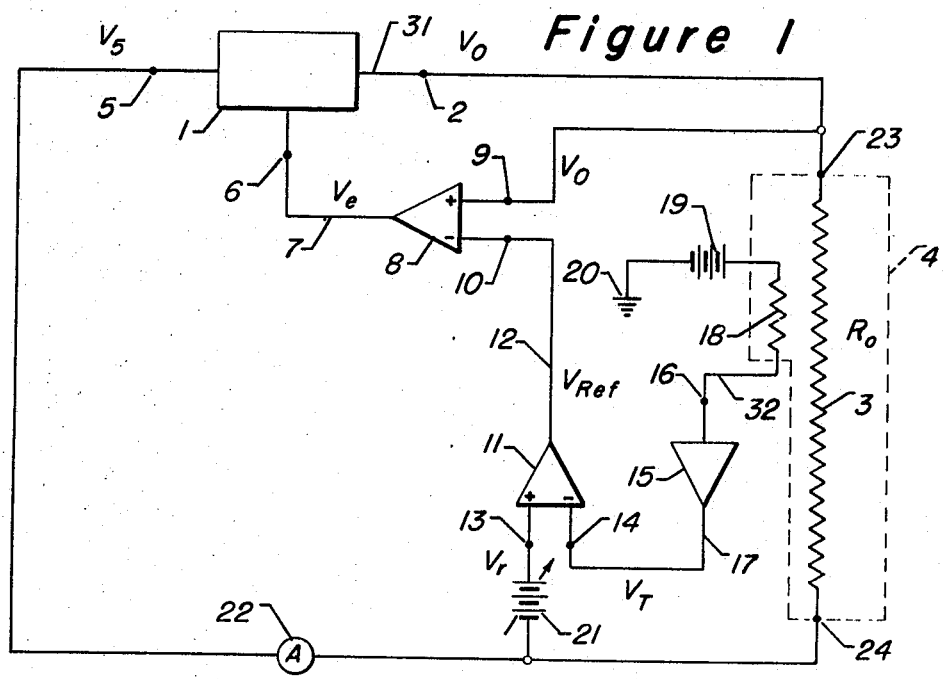
FIG. 1 is a diagram of a resistance probe corrosion-measuring device utilizing the present invention.

The invention illustrated in FIG. 1 is a resistance-probe corrosion-measuring device having a stable, adjustable current source 1, an electrically conductive corrosion test specimen 3, and a current sensing means 22, all connected in series. The invention is an improvement over conventional resistance-probe corrosion-measuring devices in that it further comprises a temperature sensitive voltage output means having a portion proximately located with respect to test specimen 3 and connected to adjustable current source 1, whereby current source 1 is adjusted to compensate for temperature changes at test specimen 3. The temperature-compensated corrosion-measuring device of FIG. 1 utilizes an electric circuit having a control terminal 2. Control terminal 2 is of no operational significance but is merely a convenient reference point in the circuit. The stable, adjustable current source 1 is connected in the electric circuit having an output 31 connected to control terminal 2. In addition, the adjustable current source 1 has a return input terminal 5 and an error voltage input terminal 6. The corrosion test specimen 3 has a first end 23 and a second end 24, and is connected in the electric circuit with the first end 23 connected to the control terminal 2. As previously mentioned, a current-sensing means 22 is connected in the electric circuit. Adjustable current source 1, control terminal 2, test specimen 3, and current-sensing means 22 are all connected in series in the electric circuit. The current-sensing means 22 may be an ammeter, a current-sensing recorder, or other current-sensing device, but has been depicted as an ammeter in the drawings. A first differential input operational amplifier 8 has an output 7 connected to the error voltage input terminal 6 of the adjustable current source 1. Operational amplifier 8 has a first input terminal 9 connected to the first end 23 of the test specimen 3. Operational amplifier 8 also has a second input terminal 10. A second differential input operational amplifier 11 has an output 12 connected to the second input terminal 10 of the first differential input operational amplifier 8. Operational amplifier 11 has a first input terminal 14 and a second input terminal 13.

A voltage output means has a temperature sensitive portion 18 proximately located with respect to the test specimen 3. The voltage output means is comprised of a thermistor 18, which is the temperature sensitive portion, the direct current voltage source 19 connected to a common point at 20, and an output terminal 32. The thermistor 18 is the only portion of the voltage output means which is necessarily located proximate to the test specimen 3. Test specimen 3 and thermistor 18 are located together in a thermally insulated jacket 4 so that thermistor 18 and test specimen 3 are always at the same temperature. A single input operational amplifier 15 has an input terminal 16 connected to the output terminal 32 of the temperature sensitive portion of the voltage output means.

Operational amplifier 15 also has an output 17 connected to the first input terminal 14 of operational amplifier 11.

A variable reference voltage source 21 is connected to the second end 24 of the test specimen 3 and input terminal 13 of operational amplifier 11. The ammeter 22 is located between the adjustable current source 1 and the connection of the voltage source 21 to the second end 24 of the test specimen 3.

A portion of the circuitry of FIG. 1 is a simplified form of a conventional potentiostat. That is, the circuitry comprising the adjustable current source 1, operational amplifiers 8 and 11 and the reference voltage source 21 and the connections to first and second ends 23 and 24 of the test specimen 3 function in the same manner as a simple, conventional potentiostat in a conventional resistance-probe corrosion-measuring device. The novelty of this invention resides in the incorporation of a voltage output means having a temperature sensitive portion into the circuitry of an otherwise conventional potentiostat.

In the operation of this invention, there is a voltage $V_o$ appearing across the test specimen 3 due to the current flowing from the adjustable current source 1 through the test specimen 3. For the instrument depicted to successfully measure corrosion of the test specimen 3, $V_o$ must be maintained at a constant value with the exception that $V_o$ must be adjusted to negate any changes in current at ammeter 22 due to temperature variations of the test specimen 3. Since the resistance $R_o$ of the test specimen 3 will normally increase with an increase in temperature or decrease with a decrease in temperature, the voltage $V_o$ must be increased or decreased accordingly so that there is no current change at ammeter 22 due to temperature variations within the thermally insulated jacket 4. Because this instrument compensates for current changes due to temperature variations, it is not vitally important to maintain an exact fixed temperature within the jacket 4. This greatly facilitates the measuring procedure and shortens the time required to obtain meaningful current measurements.

Each of the differential input operational amplifiers in the system modifies the difference in voltage applied to its inputs. That is, the voltage on one of the input terminals may be considered to be subtracted from the voltage of the other input terminal, and the resultant differential voltage times a gain factor appears at the operational amplifier output. The thermistor 18 is merely a resistor which varies with temperature. The thermistor may be constructed so that the resistance value either increases or decreases with an increase in temperature in the thermally insulated jacket 4. For the illustrated embodiment of the invention, a thermistor that increases in resistance value when the temperature within the insulated jacket 4 decreases is used. Conversely, when the temperature within insulated jacket 4 increases, the resistance of thermistor 18 decreases.

Considering the case where the temperature within thermally insulated jacket 4 increases, it can be seen that the resistance value of the thermistor 18 will decrease. Since the voltage source 19 is constant, the voltage drop across thermistor 18 will decrease since this voltage drop is a product of current times resistance. This will result in a larger voltage appearing at the output terminal 32 of the voltage output means. This larger voltage appears at the input terminal 16 of operational amplifier 15 and is amplified to appear at output terminal 17. The voltage $V_T$ appearing at output terminal 17 is larger than the voltage at output terminal 17 that existed prior to the increase in temperature within thermally insulated jacket 4. The increase in voltage at terminal 17 also increases the voltage at input terminal 14. The voltage $V_{Ref}$ at output terminal 12 of operational amplifier 11 is the result of an amplification factor of gain $A_2$ times the difference in voltage between the voltage $V_r$ at input terminal 13 minus the voltage $V_T$ at input terminal 14. That is, $V_{Ref}=A_2(V_r-V_T)$. It can be seen that $V_{Ref}$ decreases due to the increase in $V_T$. Conversely, the voltage $V_e$ at output 7 increases since the output voltage of operational amplifier 8 is the product of a constant gain $A_1$ times the voltage $V_o$ at input terminal 9 minus the voltage $V_{Ref}$ at input terminal 10. That is $V_e=A_1(V_o-V_{Ref})$. Since the voltage $V_{Ref}$ is decreased, the voltage differential is larger and the voltage output $V_e$ at output 7 is larger. This larger voltage is applied to the error voltage input terminal 6 of current source 1. The current at output 31 of the variable current source 1 is the result of the product of a current gain $A_I$ times the voltage $V_e$ at the error voltage input terminal 6. That is, $I_o=A_I V_e$. Since the voltage at input terminal 6 is larger due to the temperature increase within jacket 4, the current $I_o$ flowing through test specimen 3 increases; thus, the voltage $V_o$ appearing at control terminal 2 increases. The magnitude of the increase in voltage at the control terminal 2 is the voltage increment necessary to increase the current through ammeter 22 by an amount equal to the decrease in current at ammeter 22 resulting from the increase in the resistance value of the test specimen 3 due to the increase in temperature within the thermally insulated jacket 4.

It can be seen that the voltage at control terminal 2 will decrease by an amount calculated to offset an increase in current resulting from a resistance decrease when the temperature drops within thermally insulated jacket 4. As the temperature falls within thermally insulated jacket 4, the resistance of test specimen 3 decreases. This tends to increase the current flow through ammeter 22. However, since the temperature sensitive voltage output means causes the voltage at control terminal 2 to decrease by decreasing the current through the test specimen 3, at static condition times current due to the resistance decrease in test specimen 3 will be offset by an equivalent voltage decrease at control terminal 2. More particularly, if temperature within jacket 4 decreases, the voltage drop across thermistor 18 increases. This results in a decrease in the value of $V_T$. Since $V_{Ref}=A_2(V_r-V_T)$, $V_{Ref}$ increases. Because $V_e=A_1(V_o-V_{Ref})$, $V_e$ decreases. As a result, $I_o$ decreases since $I_o=A_I V_e$.

The temperature compensation present in this invention will leave the change in resistance in the test specimen 3 due to corrosion of the test specimen 3 as the only uncompensated variable affecting current. The rate of corrosion can be measured by the rate of decrease of current in ammeter 22 over a period of time.

It is to be understood that each of the operational amplifiers depicted has its own power source and may be of any conventional design used to achieve the specified functions as previously explained. Also, it should be noted that there would be a slight change in circuitry if thermistor 18 were replaced with a thermistor having a resistance value that increased with increasing temperature and decreased with a decreasing temperature within thermally insulated jacket 4. With comparable modifications, other temperature-sensing devices could also be used. The temperature-sensing devices illustrated are only examples of obtaining the desired voltage signal. The use of other conventional means for accomplishing the same result is contemplated within the scope of this invention. While the resistance values of thermistor 18 and test specimen 3 have been described as varying in direct proportion to temperature changes, such a circuit design arises out of convenience rather than necessity. Whatever the relationship of resistance values of thermistor 18 and test specimen 3 to temperature, the invention will be operable as long as the operational amplifiers are chosen so as to convert the voltage change from the temperature sensitive voltage output means into a voltage change at the control terminal 2 which will exactly compensate for the resistance change of the test specimen 3 due to temperature.

The reference voltage source may be a battery or any other type of direct current source. For a given test specimen and for known operational amplifiers, the reference voltage source may be one having a fixed potential, though as a practical matter it is depicted as a variable voltage source as in a conventional potentiostat so as to accommodate different test specimens, operational amplifiers, and voltage output means.

Figure 2:
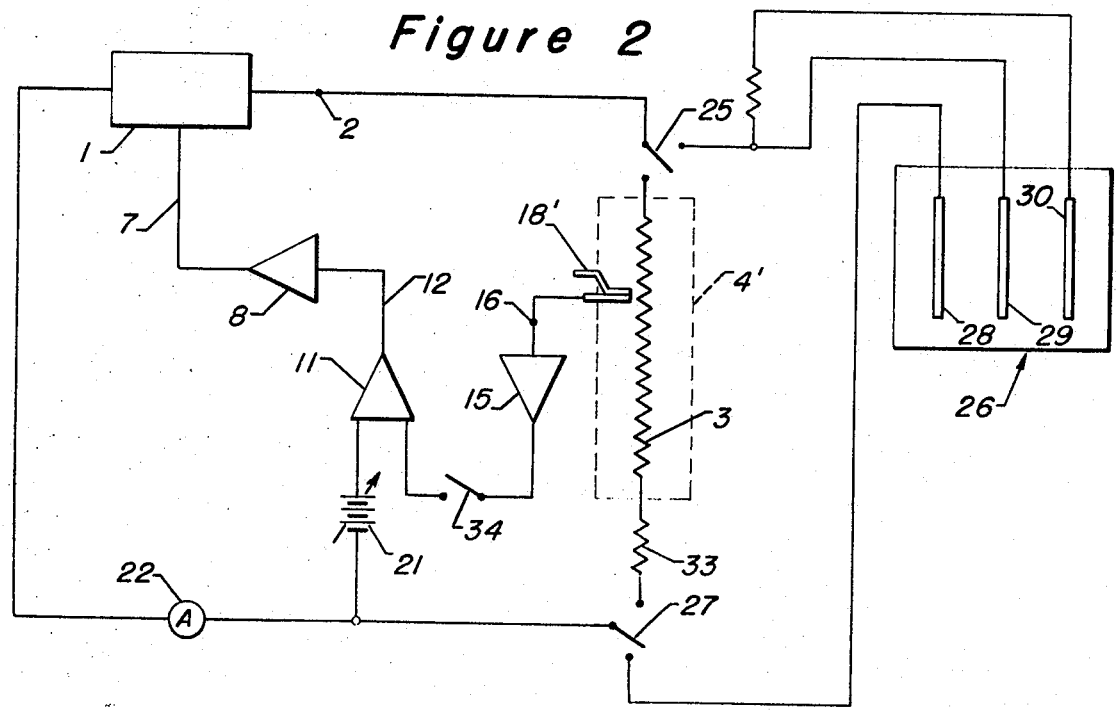
FIG. 2 is the combination of a modification of the resistance-probe corrosion-measuring device of FIG. 1 used in alternative operation with a linear polarization corrosion-measuring device.

Because of the desirability of using either linear polarization measurements or resistance probe measurements in determining corrosion rates, a combination of the resistance-probe corrosion-measuring device of this invention and a linear polarization instrument is illustrated in FIG. 2. A modified form of the corrosion measuring device of FIG. 1 is included in FIG. 2. Switches 25 and 27 connect adjustable current source 1 and ammeter 22 in series alternatively with the corrosion test specimen 3 and with electrodes 28, 29, and 30 of a conventional linear polarization probe assembly 26. Linear polarization cell or probe assembly 26 has a control or working electrode 29, a reference electrode 28, and an auxiliary electrode 30. The resistance-probe corrosion-measuring device of FIG. 2 has two modifications over that of FIG. 1. A resistor 33 is included in the electrical circuit of FIG. 2. The purpose of this resistor 33 is to keep the current measurements at ammeter 22 in the same order of magnitude regardless of whether adjustable current source 1 and ammeter 22 are connected to the linear polarization instrument 26 or to the corrosion test specimen 3. Resistor 33 is necessary because a linear polarization cell has a much higher resistance than a resistance probe measuring device.

Another deviation from the circuitry of FIG. 1 is that the voltage output means of FIG. 1 is replaced by a thermocouple 18'. Thermocouple 18' is comprised of two wires of different metals joined in a junction at their ends and producing a thermoelectric potential difference when there is a difference in temperature between the junction and the opposite ends of the dissimilar metal wires. The magnitude of the e.m.f. potential differential varies with the temperature difference between the ends. Thermocouple 18' is constructed so that the potential differential produced therein increases with an increase in temperature within the thermally insulated jacket 4' and decreases with a reduction of temperature within the jacket 4' if the ambient temperature surrounding jacket 4' remains constant. In the modification of FIG. 2 it is necessary that the temperature surrounding the thermally insulated jacket 4' be kept constant so that changes in ambient temperature do not affect the output current at control terminal 2. The voltage at input terminal 16 of operational amplifier 15 varies directly with the change in potential differential at thermocouple 18'.

The resistance-probe corrosion-measuring device of FIG. 2 performs in the same manner as than of FIG. 1. In addition, the electric circuit containing the adjustable current source 1, differential input operational amplifiers 8, 11, and 15 and ammeter 22 may be connected to the linear polarization instrument 26 for an alternative form of corrosion measurement. When he switches 25 and 27 are connected to the linear polarization cell 26, the switch 34 is opened so that no unwanted influence from the voltage output means of the resistance-probe corrosion-measuring device is introduced into the system. When the switches 25 and 27 contact the ends of the test specimen 3, the switch 34 is closed so as to make operable the apparatus of this invention providing for temperature compensation.

The foregoing description and illustration of the embodiments of this invention are for purposes of illustration only, and no unnecessary limitations should be construed therefrom as other modifications will be obvious to those skilled in the art of corrosion measurement.

We claim as our invention:

1. In a resistance-probe corrosion-measuring device having a stable, adjustable current source, an electrically conductive corrosion test specimen, and a current-sensing means, connected in series, the improvement comprising a temperature sensitive voltage output means having a portion proximately located with respect to said test specimen and connected to said adjustable current source, whereby said current source is adjusted to compensate for temperature changes at said test specimen.

2. The resistance-probe corrosion-measuring device of claim 1 further characterized in that said current source is a potentiostat.

3. A temperature compensated corrosion-measuring device comprising:
  a. an electric circuit having a control terminal;
  b. an adjustable current source connected in said circuit and having an output connected to said control terminal and having a return input terminal connected in said circuit and having an error voltage input terminal;
  c. an electrically conductive corrosion test specimen having first and second ends and connected in said electric circuit with said first end connected to said control terminal;
  d. A current-sensing means connected in said electric circuit in series with said test specimen;
  e. A first differential input operational amplifier having an output connected to said error voltage input terminal of said adjustable current source having a first input terminal connected to said first end of said test specimen and having a second input terminal;
  f. a second differential input operational amplifier having an output connected to said second input terminal of said first differential input operational amplifier and having first and second input terminals;
  g. a voltage output means having a temperature sensitive portion proximately located with respect to said test specimen and having an output terminal;
  h. a single input operational amplifier having an input terminal connected to said output terminal of said voltage output means and having an output connected to said first input terminal of said second differential input operational amplifier; and,
  i. a reference voltage source connected to said second end of said test specimen and connected to said second input terminal of said second differential input operational amplifier.

4. The combination comprising a resistance-probe corrosion-measuring device having a stable, adjustable current source, an electrically conductive corrosion test specimen, and a current-sensing means connected in series, and a temperature sensitive voltage output means proximately located with respect to said test specimen and connected to said adjustable current source, whereby said current source is adjusted to compensate for temperature changes at said test specimen, and a linear polarization corrosion-measuring instrument having electrodes, and switches connecting said adjustable current source and said current-sensing means in series alternatively with said test specimen and with said electrodes of said linear polarization cell.